United States Patent
Young

[11] Patent Number: 6,116,531
[45] Date of Patent: Sep. 12, 2000

[54] FISHING REEL DRAG MECHANISM

[75] Inventor: John N. Young, Fairfax, Calif.

[73] Assignee: Pacific Products, San Rafael, Calif.

[21] Appl. No.: 09/196,662

[22] Filed: Nov. 19, 1998

[51] Int. Cl.$^7$ .................................................. A01K 89/02
[52] U.S. Cl. ........................ 242/301; 242/292; 242/306; 242/247; 188/336
[58] Field of Search ................... 242/301, 292, 242/294, 303, 306, 247, 248; 188/336, 337, 250 H

[56] References Cited

U.S. PATENT DOCUMENTS

| | | | |
|---|---|---|---|
| 659,997 | 10/1900 | Altmeyer | 188/336 |
| 1,908,462 | 5/1933 | Taylor | 188/336 X |
| 2,573,074 | 10/1951 | Von Pein | 242/301 X |
| 2,863,617 | 12/1958 | Chapin et al. | 242/248 X |
| 3,061,232 | 10/1962 | Clark | 242/292 |
| 4,162,049 | 7/1979 | Stutz, Jr. | 242/292 |
| 4,778,123 | 10/1988 | Yoshikawa . | |
| 5,197,690 | 3/1993 | Hlava . | |
| 5,246,093 | 9/1993 | Wang | 188/336 |
| 5,407,144 | 4/1995 | Ryall | 242/301 X |
| 5,417,377 | 5/1995 | Park | 242/292 |

FOREIGN PATENT DOCUMENTS

| | | | |
|---|---|---|---|
| 21365 | 7/1914 | United Kingdom | 242/292 |
| 246223 | 1/1926 | United Kingdom | 188/337 |

*Primary Examiner*—Donald P. Walsh
*Assistant Examiner*—Minh-Chau Pham
*Attorney, Agent, or Firm*—Jack Lo

[57] ABSTRACT

A fishing reel drag mechanism includes a spool for a fishing line, a brake drum attached coaxially to the spool, and a resilient circular brake shoe positioned inside the brake drum. The outer diameter of the brake shoe is slightly smaller than the inner diameter of the brake drum. A gap is provided on the brake shoe, and a movable spreader is positioned in the gap. When the spreader is moved to a first position, the brake shoe is in a relaxed position spaced from the brake drum, so that the spool may rotate with zero drag. When the spreader is gradually moved to a second position, the gap is gradually expanded by the spreader, and the brake shoe is gradually expanded against the brake drum. The drag on the brake drum is thus adjusted by changing the width of the gap with the spreader. Grooves arranged concentrically around the brake shoe provide additional compliance which improves smoothness in drag application and the range of drag force provided. A pawl may be selectively moved into engagement with ratchet teeth around the spool to positively lock the spool in position when desired.

9 Claims, 5 Drawing Sheets

FISHING REEL DRAG MECHANISM

BACKGROUND OF THE INVENTION

1. Field of the Invention

This invention relates generally to fishing reels.

2. Prior Art

A typical fishing reel includes a fishing line wound around a rotatable spool. A drag mechanism provides an adjustable drag on the reel for controlling the rotation of the reel and release of the line. Typically, the drag is provided by axially clamping the spool between a fixed washer on one side, and a dial adjustable washer on the other side. A variable pinching force is applied to the spool by the washers for adjusting the drag on the spool. Such a drag mechanism is shown in U.S. Pat. No. 5,197,690 to Hlava, and 4,778,123 to Yoshikawa.

Even when adjusted to the minimum drag position, the washers of prior art drag mechanisms remain in contact with the spool. A minimum drag is thus always applied, which limits the rotational freedom of the spool. The washers are typically much smaller in diameter than the spools. Heat builds up rapidly in the small washers, which reduces the efficiency of the drag mechanism. The drag is applied relatively close to the axis of the spool by the small washers, so that a very high compression force is required to provide a given level of drag. Such a high compression force is difficult for a user to apply. Even when adjusted for maximum drag, prior art drag mechanisms often cannot completely stop the reel from rotating when a heavy pull is applied to the fishing line.

OBJECTS OF THE INVENTION

Accordingly, objects of the present fishing reel drag mechanism are:

to provide adjustable drag on a fishing reel spool;

to apply zero drag if desired for unimpeded spool rotation;

to provide enough drag if desired for preventing spool rotation even when a heavy pull is applied to the fishing line;

to provide an improved drag to input force ratio;

to positively lock the spool in position when desired to prevent rotation regardless of the pull on the line; and to improve heat transfer and thus maintain selected drag efficiency and selected drag level.

Further objects of the present invention will become apparent from a consideration of the drawings and ensuing description.

BRIEF SUMMARY OF THE INVENTION

A fishing reel drag mechanism includes a spool for a fishing line, a brake drum attached coaxially to the spool, and a resilient circular brake shoe positioned inside the brake drum. The outer diameter of the brake shoe is slightly smaller than the inner diameter of the brake drum. A gap is provided on the brake shoe, and a movable spreader is positioned in the gap. When the spreader is moved to a first position, the brake shoe is in a relaxed position spaced from the brake drum, so that the spool may rotate with zero drag. When the spreader is gradually moved to a second position, the gap is gradually expanded by the spreader, and the brake shoe is gradually expanded against the brake drum. The drag on the brake drum is thus adjusted by changing the width of the gap with the spreader. Grooves arranged concentrically around the brake shoe provide additional compliance which improves smoothness in drag application and the range of drag force provided. A pawl may be selectively moved into engagement with ratchet teeth around the spool to positively lock the spool in position when desired.

DRAWING REFERENCE NUMERALS

| | |
|---|---|
| 10. Spool | 11. Axle |
| 12. Hood | 13. Fishing Line |
| 14. Brake Drum | 15. Brake Shoe |
| 16. Drag Adjustment Shaft | 17. Gap |
| 18. Spreader | 19. Wheel |
| 20. Spring | 21. Spring |
| 22. Pawl | 23. Supporting Plate |
| 24. Pin | 25. Teeth |
| 26. Notch | 27. Groove |
| 28. Tapered Shoulders | 29. Brake Shoe |
| 30. Gap | 31. Groove |
| 32. Tapered Shoulders | 33. Groove |
| 34. Knob | |

DETAILED DESCRIPTION OF THE INVENTION

Figure 1:
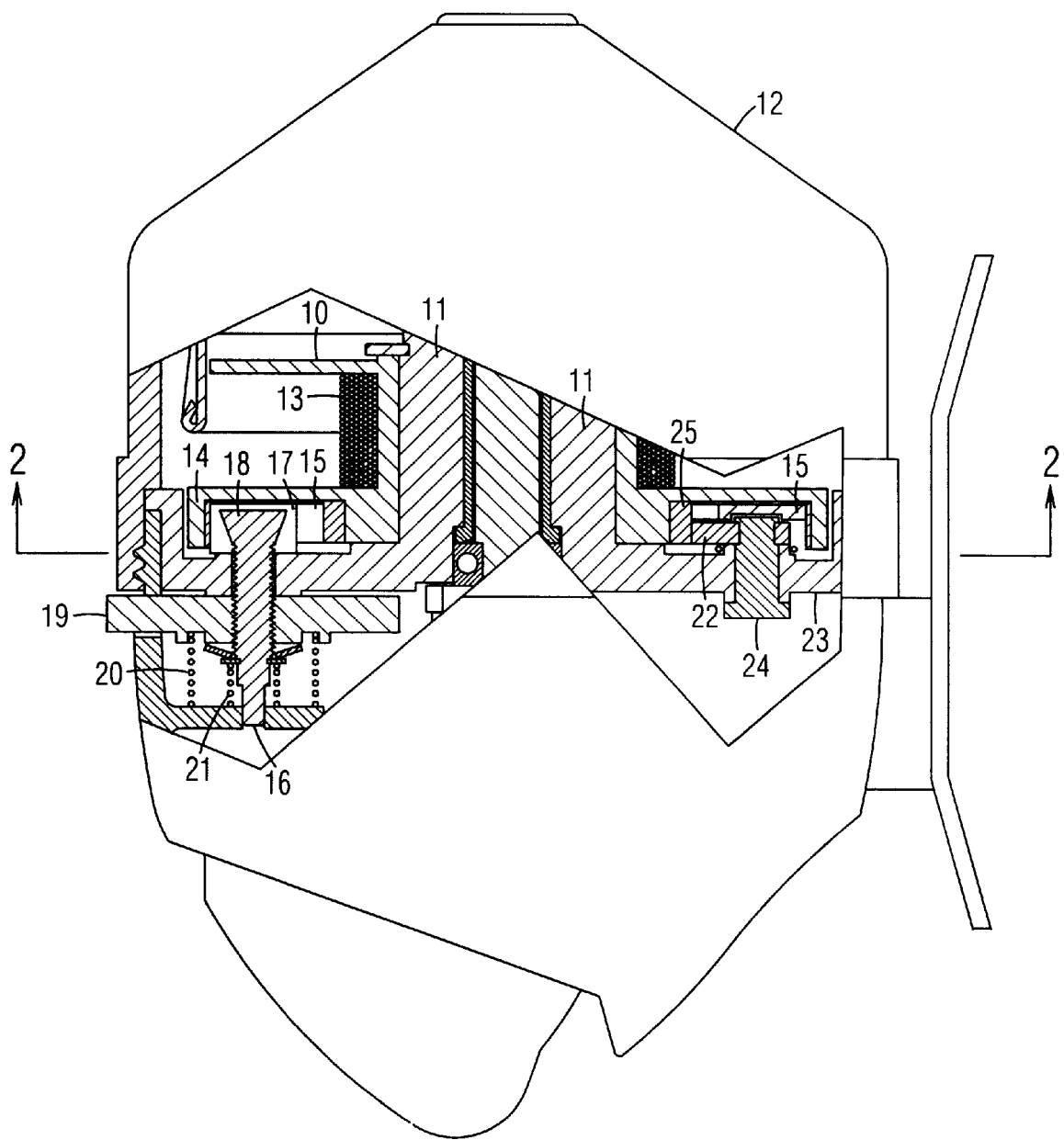
FIG. 1 is a side cutaway view of the present fishing reel drag mechanism.

FIG. 1:

A preferred embodiment of the present fishing reel drag mechanism is shown in a side cutaway view in FIG. 1. It includes a spool 10 journaled on an axle 11 attached inside a hood 12, and a fishing line 13 wound around spool 10. A circular brake drum 14 is attached coaxially to spool 10. Brake drum 14 is preferably of about the same outside diameter as spool 10 for maximizing its size. A resilient circular brake shoe 15 is positioned coaxially inside brake drum 14. A threaded, drag adjustment shaft 16 is positioned perpendicularly through a discontinuation or gap 17 in brake shoe 15. Shaft 16 is axially movable, but not rotationally movable. Shaft 16 includes a wedge or spreader 18. A thumb wheel 19 is threaded around shaft 16. Springs 20 and 21 respectively bias wheel 19 and shaft 16 toward spool 10. A drag lock pawl 22 is pivotally attached to a supporting plate 23 inside hood 12 on a pin 24. Pawl 22 is arranged for releasably engaging ratchet teeth 25 arranged coaxially around spool 10.

Figure 2:
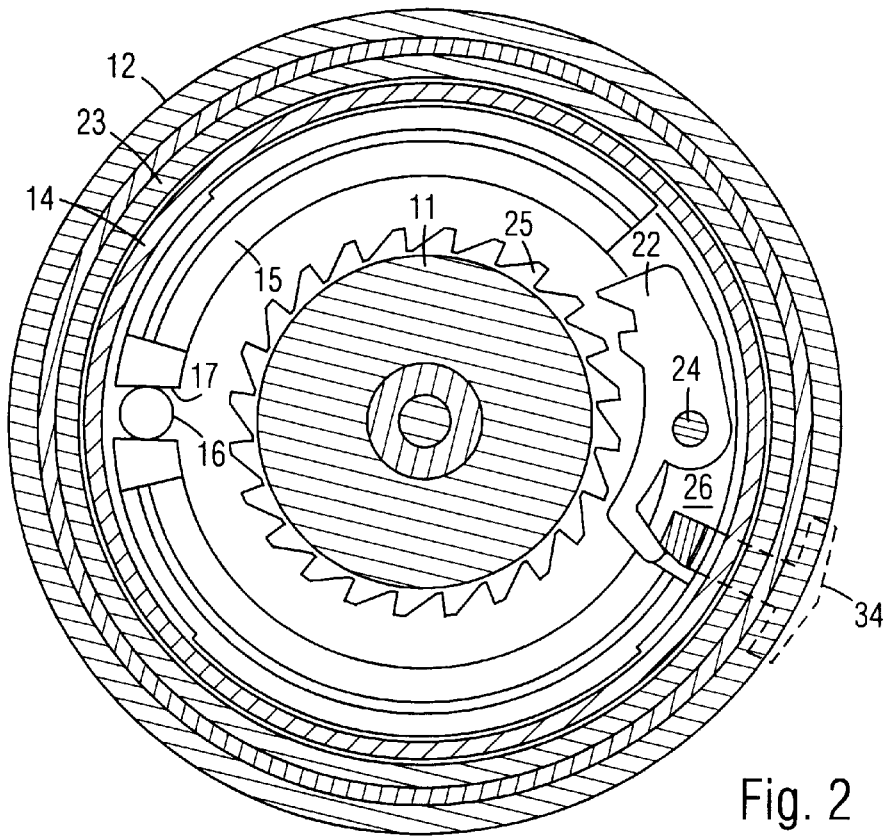
FIG. 2 is an end sectional view of the drag mechanism showing a drag lock in a disengaged position, taken along line 2—2 in FIG. 1.
Figure 3:
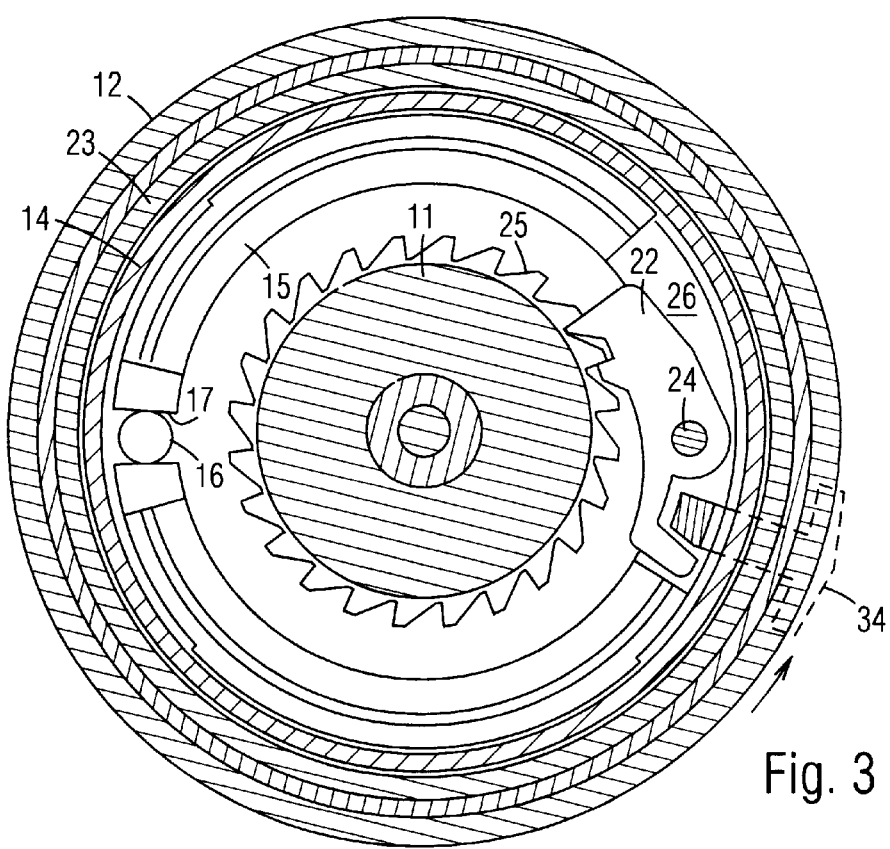
FIG. 3 is an end sectional view of the drag mechanism showing the drag lock in a locked position.

FIGS. 2–3:

As shown in the end sectional views in FIGS. 2 and 3, drag lock pawl 22 is positioned in a notch 26 provided in brake shoe 15. A knob 34 positioned through hood 12 is used to move drag lock pawl 22 between a released position away from ratchet teeth 25 shown in FIG. 2, and a locked position against ratchet teeth 25 by shown in FIG. 3. Knob 27 is shown in phantom lines because it is positioned above the cutting plane in the view. When pawl 22 is released from ratchet teeth 25, brake drum 14 and the spool may rotate if the pull on the fishing line is higher than the set drag. When pawl 22 is locked against ratchet teeth 25, brake drum 14 and the spool cannot rotate clockwise to release the fishing line, regardless of the pull on the fishing line.

FIGS. 4–7

Figure 4:
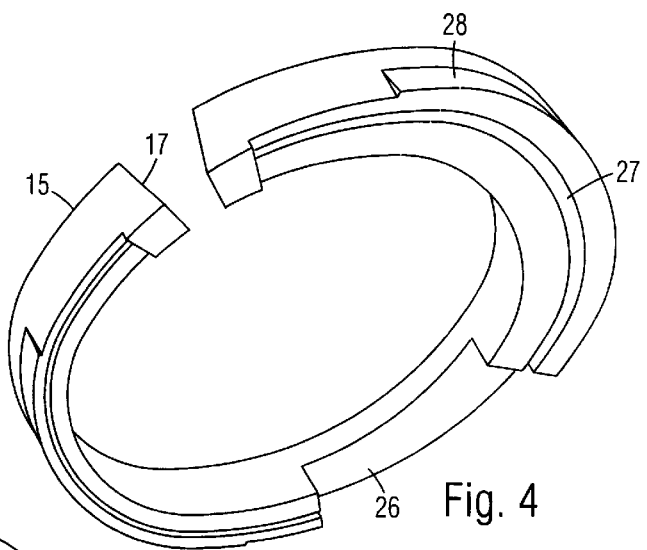
FIG. 4 is a side perspective view of a brake shoe of the drag mechanism.
Figure 5:
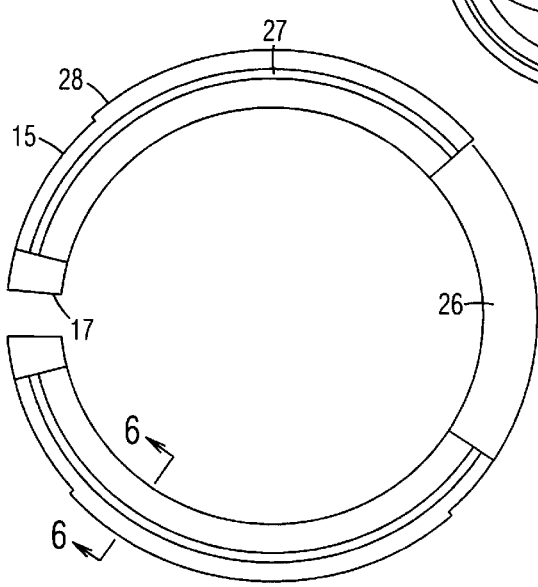
FIG. 5 is an end view of the brake shoe.
Figure 6:
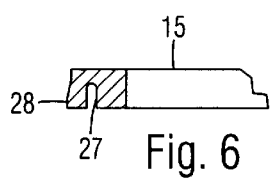
FIG. 6 is a side sectional view of the brake shoe in a relaxed position, taken along line 6—6 in FIG. 5.
Figure 7:
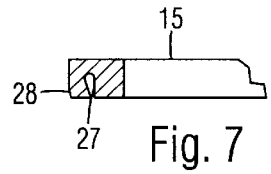
FIG. 7 is a side sectional view of the brake shoe in a compressed position.

Brake shoe 15 is shown in a perspective view in FIG. 4, and an end view in FIG. 5. It is ring-shaped, and has an outer diameter slightly smaller than the inner diameter of the brake drum. Gap 17 is arranged for being engaged by the expander of the drag adjustment shaft. Notch 26 is arranged for accommodating the drag lock pawl therein. Arcuate grooves 27 are arranged coaxially on one face of brake shoe 15, and tapered shoulders 28 are arranged on the sides of brake shoe 15. As shown in the sectional view in FIG. 6, brake shoe 15 is divided into outer and inner portions by groove 27. When brake shoe 15 is pressed against the brake drum, the outer portion is bent inwardly for smoothly increasing the drag, as shown in FIG. 7. Tapered shoulder 28 is positioned at an angle relative to the surface of the brake drum, so that when brake shoe 15 is pressed against the brake drum, the contact area of shoulder 28 on the brake drum is gradually increased for smoothly increasing the drag.

Figure 8:
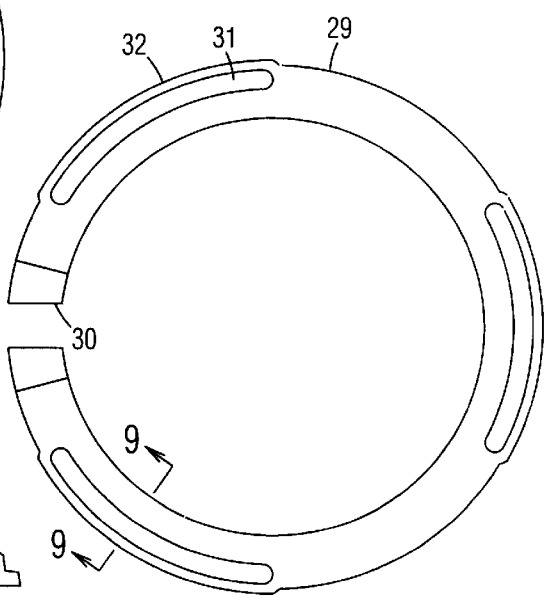
FIG. 8 is an end view of an alternative embodiment of the brake shoe.
Figure 9:
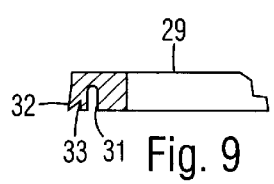
FIG. 9 is a side sectional view of the brake shoe of FIG. 8 in a relaxed position, taken along line 9—9 in FIG. 8.
Figure 10:
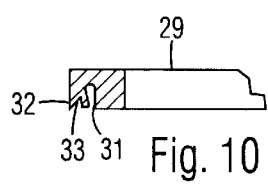
FIG. 10 is a side sectional view of the brake shoe of FIG. 8 in a compressed position.

FIGS. 8–10:

An alternative brake shoe 29 is shown in FIGS. 8–10. It is also ring-shaped and includes a tapered gap 30. Arcuate grooves 31 are arranged around it on one face. Tapered shoulders 32 are arranged around the rim of brake shoe 29, preferably only alongside grooves 31. As shown in the sectional view in FIG. 9, a shallower second groove 33 may be arranged on the outer portion of brake shoe 29 alongside each groove 31 for further increasing the compliance of brake shoe 29, and thus further increasing smoothness during drag application, as shown in FIG. 10.

Figure 11:
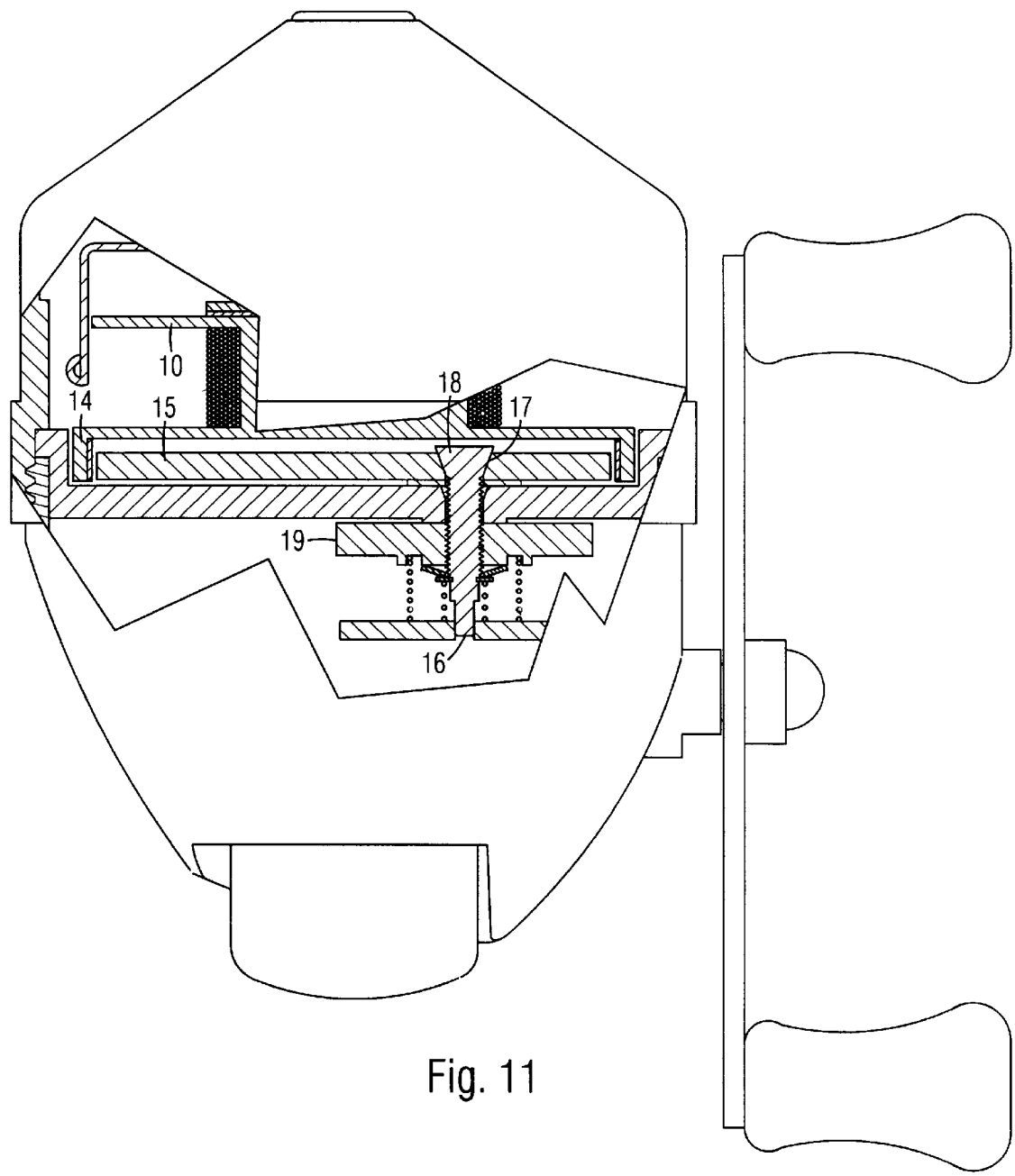
FIG. 11 is a top cutaway view of the drag mechanism when set to zero drag.
Figure 12:
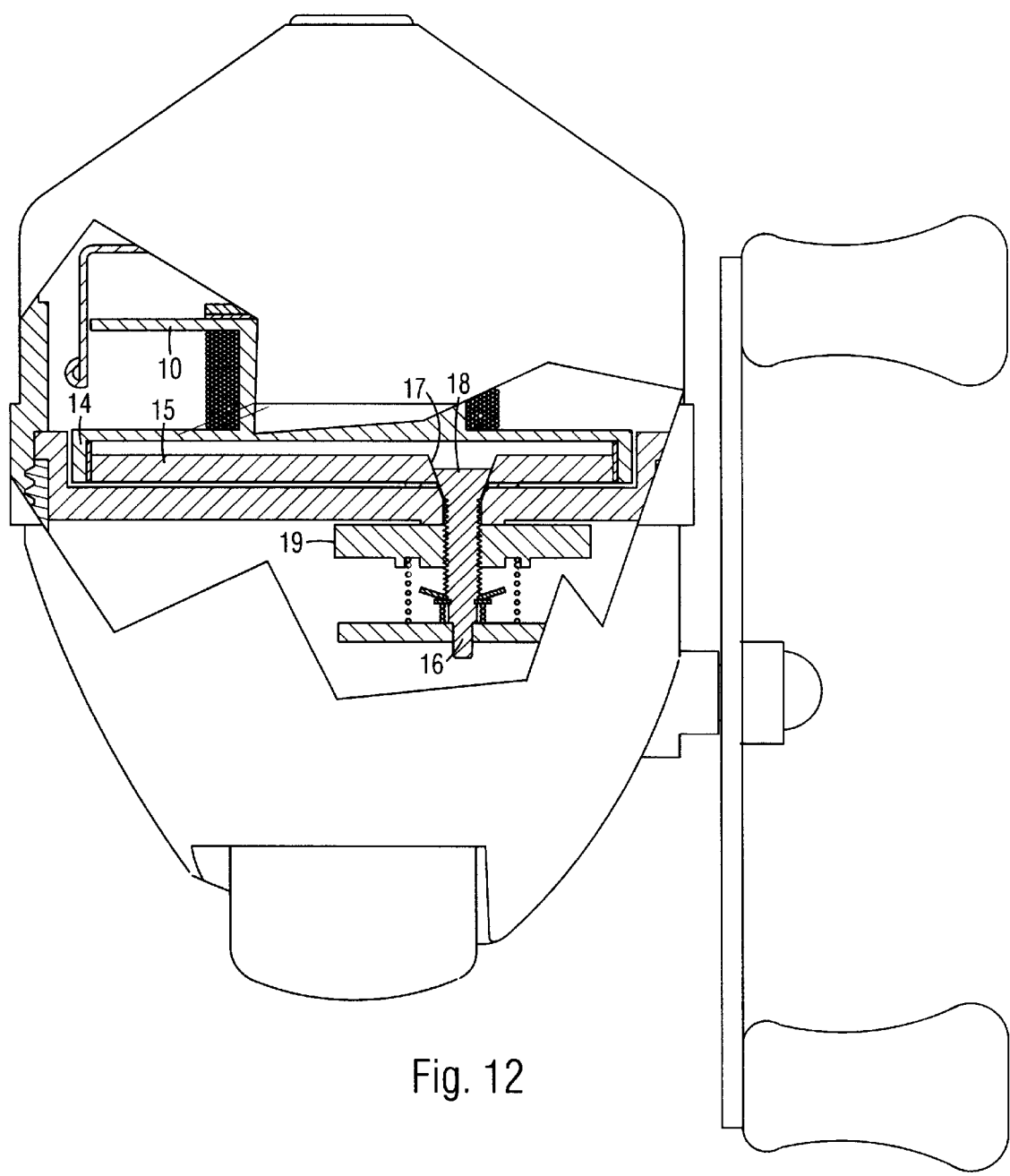
FIG. 12 is a top cutaway view of the drag mechanism when set to maximum drag.

FIGS. 11–12:

The drag mechanism is shown in a top cutaway view in FIG. 11. Spreader 18 of drag adjustment shaft 16 is adjusted toward the larger end of gap 17 by turning wheel 19. Brake shoe 15 is in a relaxed state, spaced away from brake drum 14, so that zero drag is applied. Spool 10 is thus allowed to rotate with zero drag from the brake mechanism. Drag may be gradually applied by turning wheel 19 to move spreader 18 toward the smaller end of gap 17, i.e., by wedging spreader 18 into gap 17, so as to expand the diameter of brake shoe 15, which is caused to be gradually pressed against brake drum 14 until maximum drag is achieved, as shown in FIG. 12. Drag is smoothly variable by turning wheel 19. The range of drag is increased by the added compliance in brake shoe 15. Because brake drum 14 is as large in diameter as spool 10, the moment arm of brake shoe 15 is maximized for the greatest possible mechanical advantage, so that a large enough drag can be applied to stop spool 10 from rotating, even when the fishing line is under a heavy pull. The large diameters of brake drum 14 and brake shoe 15 also enable drag to be applied with a smaller input force from the user on wheel 19. Brake drum 14 is preferably made of a heat conducting material, so that the heat produced by friction will pass through the outside wall of the drum to radiate into the surrounding air. Further, the areas between tapered shoulders 28 or 32 improve cooling because they tend to not be in contact with brake drum 14.

SUMMARY AND SCOPE

Accordingly, a fishing reel drag mechanism is provided. It provides adjustable drag on a fishing reel spool. It applies zero drag if desired for unimpeded spool rotation. It provides enough drag if desired for preventing spool rotation even when a heavy pull is applied to the fishing line. It provides an improved drag to input force ratio. It positively locks the spool in position when desired to prevent rotation regardless of the pull on the line. It also improves heat transfer from the brake to maintain braking effectiveness.

Although the above description is specific, it should not be considered as a limitation on the scope of the invention, but only as an example of the preferred embodiment. Many variations are possible within the teachings of the invention. For example, the rest of the fishing reel may be of any construction. The number of grooves in the brake shoe may be different. The grooves may extend all the way around the brake shoe. The tapered shoulders may extend more or less around the brake shoe. Gap 17 may be parallel instead of tapered, and spreader 18 may be any other mechanism or device that spread apart gap 17, such as a pivoting plate rotatable about the axis of shaft 16. Therefore, the scope of the invention should be determined by the appended claims and their legal equivalents, not by the examples given.

I claim:

1. A fishing reel drag mechanism, comprising:

a spool for a fishing line;

a hollow brake drum attached coaxially to said spool and rotatable about a common axis, said brake drum having a circular interior surface;

a resilient circular brake shoe positioned coaxially inside said brake drum, an outer diameter of said brake shoe being slightly smaller than an inner diameter of said brake drum, said brake shoe having a discontinuation comprised of a gap; and a generally wedge-shaped spreader positioned in said gap of said brake shoe and movable in a direction generally perpendicular to a plane of said brake shoe;

wherein when said spreader is moved to a first position in a first direction toward a wider end thereof, said gap is contracted and said brake shoe is in a relaxed position spaced from said brake drum, and said brake drum is freely rotatable; and when said spreader is moved to a second position in a second direction toward a smaller end thereof, said gap is expanded by said spreader and said brake shoe is tightly pressed against said interior surface of said brake drum, and said brake drum is substantially prevented from rotating;

thereby drag on said brake drum is adjustable to control rotation thereof by moving said spreader between said first and said second positions and controlling a width of said gap.

2. The fishing reel drag mechanism of claim 1, wherein said brake drum has a maximum diameter substantially similar to a maximum diameter of said spool for maximizing drag.

3. The fishing reel drag mechanism of claim 1, further including a threaded drag adjustment shaft with one end attached to said spreader, wherein said shaft is positioned perpendicularly through said gap in said brake drum and movable linearly but fixed rotationally; and further including a thumb wheel threaded onto said shaft and generally fixed in distance relative to said brake drum, wherein said drag on said brake drum is smoothly and gradually variable by rotating said thumb wheel and moving said spreader within gap of said brake shoe, and said spreader is maintained in a selected position to maintain constant drag on said brake drum even when said thumb wheel is released by a user.

4. A fishing reel drag mechanism, comprising:

a spool for a fishing line;

a hollow brake drum attached coaxially to said spool and rotatable about a common axis, said brake drum having a circular interior surface;

a resilient circular brake shoe positioned coaxially inside said brake drum, an outer diameter of said brake shoe being slightly smaller than an inner diameter of said brake drum, said brake shoe having a discontinuation comprised of a gap, said brake shoe having a circular outer side and opposite end faces perpendicular to an axis of said brake shoe, said brake shoe having an arcuate groove arranged on one of said end faces and extending parallel to said outer side, said groove dividing said brake shoe into an outer portion and a coaxial inner portion of smaller diameter for additional compliance between said outer side and an inner side of said brake shoe; and a spreader positioned in said gap of said brake shoe and movable between a first position and a second position, so that when said spreader is in said first position, said brake shoe is in a relaxed position spaced from said brake drum, and said brake drum is rotatable with substantially zero drag, and when said spreader is gradually moved toward said second position, said gap is gradually expanded by said spreader and said brake shoe is gradually expanded against said interior surface of said brake drum, thereby drag on said brake drum is adjusted by controlling a width of said gap with said spreader, when said brake shoe is expanded against said brake drum, said outer portion of said brake shoe is bent inwardly for smoothly increasing said drag.

5. The fishing reel drag mechanism of claim 4, wherein said brake drum has a maximum diameter substantially similar to a maximum diameter of said spool for maximizing drag.

6. The fishing reel drag mechanism of claim 4, further including a threaded drag adjustment shaft with one end attached to said spreader, wherein said shaft is positioned perpendicularly through said gap in said brake drum and movable linearly but fixed rotationally; and further including a thumb wheel threaded onto said shaft and generally fixed in distance relative to said brake drum, wherein said drag on said brake drum is smoothly and gradually variable by rotating said thumb wheel and moving said spreader within gap of said brake shoe, and said spreader is maintained in a selected position to maintain constant drag on said brake drum even when said thumb wheel is released by a user.

7. The fishing reel drag mechanism of claim 4, further including at least one tapered shoulder arranged on said outer side of said brake shoe, said tapered shoulder being positioned at an angle relative to said interior surface of said brake drum, so that when said brake shoe is pressed against said brake drum, a contact area of said tapered shoulder on said brake drum is gradually increased for smoothly increasing said drag.

8. The fishing reel drag mechanism of claim 4, further including at least one shallower second groove arranged on said one of said end faces of said brake shoe on said outer portion for providing even more compliance.

9. A fishing reel drag mechanism, comprising:

a supporting plate;

a spool for a fishing line, said spool being rotatable about an axis generally perpendicular to said supporting plate;

a plurality of ratchet teeth fixed relative to said spool and arranged coaxially about said axis;

a knob movable generally parallel to a circumference of said spool;

a pawl pivoted on said supporting plate;

wherein a first end of said pawl is movable against said ratchet teeth to prevent rotation of said spool;

wherein a second end of said pawl is substantially angled relative to said circumference of said spool and in releasable and direct engagement with said knob;

wherein when said knob is moved between a first position and a second position, said first end of said pawl is respectively moved by said knob against and away from said ratchet teeth to lock and release said spool.

* * * * *